Oct. 14, 1969   R. P. VINCENT ET AL   3,472,538
JOINT FOR COUPLING TWO TUBULAR MEMBERS TOGETHER
Filed Feb. 28, 1968

INVENTOR.
RENIC P. VINCENT
LAWRENCE B. WILDER

*John D. Gassett*
ATTORNEY

United States Patent Office 3,472,538
Patented Oct. 14, 1969

3,472,538
JOINT FOR COUPLING TWO TUBULAR
MEMBERS TOGETHER
Renic P. Vincent and Lawrence B. Wilder, Tulsa, Okla.,
assignors to Pan American Petroleum Corporation,
Tulsa, Okla., a corporation of Delaware
Filed Feb. 28, 1968, Ser. No. 708,839
Int. Cl. F16l 21/02, 19/00
U.S. Cl. 285—374                                    8 Claims

ABSTRACT OF THE DISCLOSURE

A heavy duty joint for coupling two tubular members together. A male portion of the end of one tubular member telescopically fits with a female portion of a second tubular member. A locking wedge or plug member fits into a window of the outer female portion and onto a shoulder member of a recessed portion of the inner male member. One side of the window is sloping so that as a crew tightens the wedge into place, the male portion and female portion are pulled closer together. Complementing sloping shoulders of the two tubular members provide a rigid connection when the plug is forced inwardly.

---

This invention relates to a joint for connecting two elongated members. It relates especially to a strong joint for connecting two tubular members which can be readily assembled or disassembled.

BACKGROUND

This invention relates to the joining of tubular members, particularly large members, in end-to-end relationship. There are many ways of connecting such joints known at this time. For example many such joints particularly in the oil field industry are connected together by threaded joints and there are many such joints commercially available. Further, there are many joints which are connected together by various clamping devices which include hydraulically power autoconnects which are used to connect a riser pipe, which extends downwardly through a drilling vessel through a body of water, to a mating connection in a subsea well head. While these joints have proved quite worthy, there is nevertheless a need for a way of connecting two tubular joints rigidly together without the necessity of hydraulic power or large bulky clamps. This invention provides such a joint.

BRIEF DESCRIPTION OF THE INVENTION

This is a mean for connecting two elongated members in which one member has a male portion at its lower end and the other member has a female portion near its upper end. The male portion has an upwardly facing shoulder member in a recess near its lower end. The female portion fits over the male portion and has a window therein which aligns with the recess of the male portion. This window has an inwardly facing shoulder sloping downwardly and inwardly. A lock wedge means fits in this window. The lock wedge has a sloping upwardly facing shoulder mating with the downwardly facing shoulder of the female portion. The lock wedge means further has a downwardly facing shoulder mating with the upwardly facing shoulder of the recess of the male portion. Means are provided to force the lock wedge means inwardly along the upwardly facing shoulder member of the lower portion and the downwarly facing shoulder of the female portion. This forces the two elongated members longitudinally together.

Various objects and a better understanding of the invention can be had from the following description taken in conjunction with the drawings in which.

Figure 1:
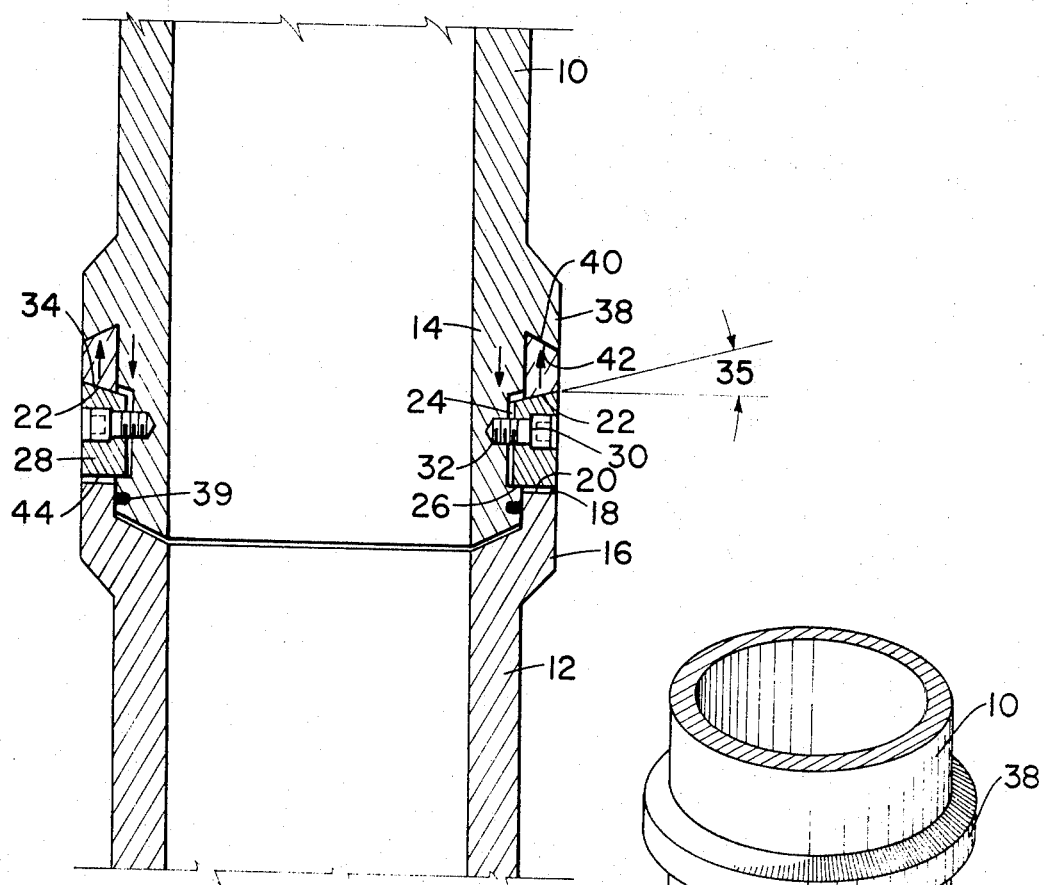
FIG. 1 illustrates a cross section through the joint connecting two elongated members.

Attention is now directed to FIG. 1. Shown thereon is an upper elongated tubular member 10 and a lower elongated tubular member 12. For purposes of this description herein, it will be assumed that the tubular members in FIG. 1 are in an upright position; however, the member may take any position. The ends of these two tubular members 10 and 12 are provided with especially enlarged portions which comprise the joint structure of the two tubular members. The lower end of tubular member 10 is provided with a male portion 14. The upper portion of tubular member 12 is provided with a female portion 16. Means are provided to provide both (a) forces holding the tubular members together longitudinally, and (b) means giving the joint added rigidity against lateral movement of one member with respect to the other.

We shall first discuss that portion of the joint which gives great strength against longitudinal movement of the two tubular joints. This includes a window 18 in female portion 16. There may be several of these windows spaced around the periphery thereof. This window 18 has a lower upwardly facing shoulder 20. The upper portion of window 18 contains a downwardly facing shoulder 22 which slopes downwardly and inwardly. This shoulder 22 form a part of the means for the wedging action needed, as will be explained more fully.

Male portion 14 contains a recessed portion 24 adjacent each window 18. Recessed portion 24 may go completely around male portion 14 if it is not required to transmit torque. If torque is to be transmitted, the lateral edges of the recess should closely fit the sides of the plug as shown more clearly in FIG. 2. This recessed portion 24 contains a lower upwardly facing shoulder 26. This upwardly facing shoulder 26 lies in a plane perpendicular to the center axis of the tubular member 10. A lock wedge means 28 is provided for each window 18. Each such wedge means contains one or more screws 30 which are screwed into receiving screw threads 32 which are provided in the male portion 14. The lower portion of wedge means 28 has a downwardly facing shoulder 44 which rests on shoulder 26 of the male portion 14. The upper side of lock wedge means 28 is provided with an upwardly facing, downwardly and inwardly sloping shoulder means 34 which mates with the downwardly facing shoulder 22 of window 18. The wedging action is obtained by relative movement between these two sloping surfaces 22 and 34.

The slope of facing 22 of window 18 and the upper shoulder 34 of plug 28 is such that the two will slide with respect to each other as plug 28 is forced inwardly to obtain a wedge effect. The angle 35 as shown in FIG. 1, which these faces 34 and 22 make with the direction of movement of plug 28, should be less than the angle of repose of steel so that there will be no outward driving force on 28 resulting from strain between members 10 and 12 which would tend to put additional strain on screws 30.

In operation, female portion 16 of lower tubular member 12 fits and is placed closely over and about male portion 14 of the other tubular member 10. Then lock wedge means 28 is placed in window 18. A wrench is then provided to tighten screw 30 into the threads of the male portion 14. As this lock wedge means moves inwardly, the female portion 16 is forced upwardly with respect to the male portion 14 which is forced downwardly. This causes a very strong force between shoulders 22 of the upper part of window 18, the upper shoulder 34 of lock wedge means 28 and between the shoulder 26 of the male portion 14 of the lower side of the lock wedge means or plug 28.

I shall now discuss that portion of the joint which gives the joint added rigidity. This includes an enlarged protruding shoulder member 38 on male portion 10 which has a downwardly facing shoulder 40. This shoulder slopes inwardly and upwardly. It is preferred that this slope upwardly at an angle with a horizontal plane of between about 10° and 30°. The upper end of female portion 16 of the other tubular member 12 is provided with an upwardly facing shoulder 42 which slopes inwardly and upwardly to mate with shoulder 40 of male member 14. The various dimensions are selected such that shoulders 42 and 40 make contact only after plug 28 has been forced inwardly so that the contact area 26 between plug 28 and male portion 10 are large enough to support the design tensile load.

Figure 2:
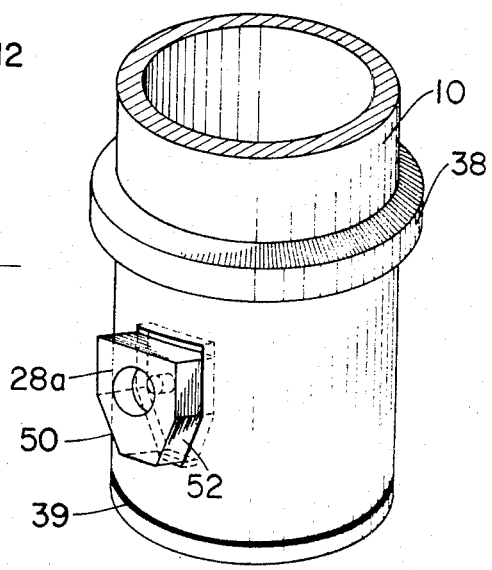
FIG. 2 shows a tapered plug fitting into tapered shoulders of the male portion of the joint and in this case the outer female portion has been removed.

Attention is now directed to FIG. 2 which shows a perspective view of the joint with the lower female portion 12 removed. The lower portion of window 18 of female portion 16 is cut to mate with the lower portion of plug 28a. Plug 28a in FIG. 2 is slightly different from the plug 28 of FIG. 1 in that it has two lower corners removed so as to have slanting faces 50 and 52 which each make an angle of about 45° with the vertical. Clearance is provided in the recess in male portion 10 so that plug 28 does not contact the male portion 10 on the surface identified as 26 in FIG. 1. The tensile load is now carried by interference between the slanting faces 50 and 52 of plug 28 and the mating surface on male portion 10. Torque between male portion 10 and female portion 12 is thus resisted. Any relative movement between male portion 10 and female portion 12 would result in a turning moment of plug 28 around screw 30. Due to the geometry of plug 28a, such movement is impossible without yielding the material. This aids in permitting the upper section and lower sections to have a joint whereby torque can be transmitted without undue stress on screws 30. In order to further aid in this regard for the transmission of torque, the window in female portion 16 is cut to have only a very small tolerance between the sides of the plug 28a having vertical components in the matching sides of the recess 24 in male portion 14.

While the above description has been given with a great deal of detail for the particular embodiments shown, it is possible to produce other embodiments without departing from the spirit or scope of the invention.

We claim:

1. A joint for connecting a first tubular member to a second tubular member which comprises:
   a male portion at the lower end of a first tubular member, said male portion having an outwardly protruding, upwardly facing shoulder member;
   a female portion at the upper end of the lower of said tubular members, said female portion being enlarged to receive the said male portion, said female portion having at least one window therein, the upper side of said window having a sloping, downwardly facing shoulder spaced above the upwardly facing shoulder of said male portion;
   a lock wedge means placed inside said window, said wedge means having a lower shoulder member mating with the upwardly facing shoulder of said male member and an upper shoulder member having a sloping surface mating with a said downwardly sloping surface of said window of said female portion;
   means for forcing said lock wedge means inwardly toward said male portion;
   the face of said shoulder member of said male portion having a surface in a plane parallel to the direction of said lock wedge means; and
   the downwardly facing shoulder of said window having a surface lying in a plane which makes an angle with the direction of movement of said lock wedge means.

2. An apparatus as defined in claim 1 including a seal means between the outer surface of said shoulder member of said male portion and the interior surface of said female portion.

3. An apparatus as defined in claim 1 in which the lower portion of said window of said female portion is wedged shaped and said lock wedge means is matingly shaped.

4. An apparatus as defined in claim 1 including
   (a) an upwardly facing shoulder at the upper end of said female portion and whose face slopes upwardly and inwardly; and
   (b) a downwardly facing shoulder sloping inwardly and upwardly in said male portion to receive said upwardly facing shoulder of element (a).

5. A joint for two elongated members which comprises:
   (a) a male portion at the lower end of a first elongated member, said male portion having an outer upwardly facing shoulder member near its lower end;
   (b) a female portion near the upper end of a second elongated member, said female portion having a downwardly facing shoulder sloping downwardly and inwardly;
   (c) a lock wedge means having (i) a sloping, upwardly facing shoulder mating with the said downwardly facing shoulder of said female portion and (ii) a downwardly facing shoulder mating with the upwardly facing shoulder of said male portion;
   (d) means to force said lock wedge means inwardly along said upwardly facing shoulder member of said male portion and said downwardly facing shoulder of said female portion;
   (e) an upwardly facing shoulder at the upper end of said female portion whose face slopes upwardly and inwardly; and
   (f) a downwardly facing shoulder sloping inwardly and upwardly in said male portion to receive said upwardly facing shoulder of element (e) whereby rigidity is added to said connection upon said downwardly facing shoulder receiving said upwardly facing shoulder of element (e).

6. An apparatus as defined in claim 5 including a seal between said female portion and said male portions below the upwardly facing shoulder of said male portion.

7. An apparatus as defined in claim 5 in which said means to force said wedge means inwardly includes a screw extending through said wedge means and engaging screw threads in the wall of said male portion.

8. A joint as defined in claim 5 in which the slope of said upwardly facing shoulder at the upper end of said female portion is at an angle with a plane perpendicular to the longitudinal axis of said joint of between 10° and 30°.

References Cited

UNITED STATES PATENTS

| | | | |
|---|---|---|---|
| 464,893 | 12/1891 | Reid et al. | 285—374 X |
| 1,261,687 | 4/1918 | Brandon | 285—374 X |
| 1,512,253 | 10/1924 | Warner | 285—403 X |
| 3,074,589 | 1/1963 | Chaney | 285—404 X |
| 3,100,121 | 8/1963 | Hillmer | 285—374 X |
| 3,183,024 | 5/1965 | Myers et al. | 285—404 X |
| 3,258,283 | 6/1966 | Winberg et al. | 285—404 X |

DAVID J. WILLIAMOWSKY, Primary Examiner

W. L. SHEDD, Assistant Examiner

U.S. Cl. X.R.

285—403, 421

PO-1050
(5/69)

UNITED STATES PATENT OFFICE
CERTIFICATE OF CORRECTION

Patent No. 3,472,538      Dated October 14, 1969

Inventor(s) Renic P. Vincent and Lawrence B. Wilder

It is certified that error appears in the above-identified patent and that said Letters Patent are hereby corrected as shown below:

Column 1, line 21, "crew" should read -- screw --

Column 2, line 30, "form" should be -- forms --.

Column 3, line 71, at the beginning of the line -- of movement -- should be inserted.

SIGNED AND
SEALED
FEB 17 1970

(SEAL)
Attest:

Edward M. Fletcher, Jr.
Attesting Officer

WILLIAM E. SCHUYLER, JR.
Commissioner of Patents